US012570145B2

(12) United States Patent
Philipp et al.

(10) Patent No.: US 12,570,145 B2
(45) Date of Patent: Mar. 10, 2026

(54) AUTOSTEREOSCOPIC CAMPFIRE DISPLAY

(71) Applicant: GM Global Technology Operations LLC, Detroit, MI (US)

(72) Inventors: Tzvi Philipp, Bet Shemesh (IL); Thomas A. Seder, Fraser, MI (US); Joseph F. Szczerba, Grand Blanc, MI (US); Manoj Kumar Sharma, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 368 days.

(21) Appl. No.: 18/483,163

(22) Filed: Oct. 9, 2023

(65) Prior Publication Data

US 2025/0116880 A1      Apr. 10, 2025

(51) Int. Cl.

| | |
|---|---|
| *B60K 35/00* | (2024.01) |
| *B60K 35/21* | (2024.01) |
| *G02B 27/00* | (2006.01) |
| *G02B 30/33* | (2020.01) |
| *G02B 30/56* | (2020.01) |
| *H04N 13/32* | (2018.01) |
| *H04N 13/363* | (2018.01) |
| *H04N 13/383* | (2018.01) |

(52) U.S. Cl.
CPC ............ B60K 35/00 (2013.01); B60K 35/211 (2024.01); G02B 27/0093 (2013.01);
(Continued)

(58) Field of Classification Search
CPC ...... G06V 20/58; G06V 20/56; G06V 20/588; G06V 20/597; G06V 20/64; G06V 20/20; G06V 40/18; G06V 10/44; G06V 40/20; G06V 40/28; G06V 40/19; G06F 3/013; G06F 3/012; G06F 3/011; G06F 3/0304;
(Continued)

(56) References Cited

U.S. PATENT DOCUMENTS

| | | |
|---|---|---|
| 2010/0027083 A1 | 2/2010 | Kroll et al. |
| 2014/0055692 A1 | 2/2014 | Kroll et al. |
| | (Continued) | |

FOREIGN PATENT DOCUMENTS

| | | |
|---|---|---|
| DE | 102008040578 A1 | 2/2010 |
| DE | 102022128426 A1 | 11/2023 |
| GB | 2610870 A | 3/2023 |

OTHER PUBLICATIONS

Seder, T., et al. U.S. Appl. No. 18/325,255, filed May 30, 2023.
United States Patent and Trademark Office. U.S. Appl. No. 18/325,255, filed May 30, 2023.

*Primary Examiner* — Daniel Chang
(74) *Attorney, Agent, or Firm* — Vivacqua Crane, PLLC

(57) ABSTRACT

A system for generating a floating image for a plurality of passengers within a vehicle includes a passenger monitoring system adapted to monitor the position of head and eyes of each passenger, a compute engine in communication with the passenger monitoring system and adapted to calculate a holographic image and encode the holographic image to a display of a picture generating unit hologram generator, and a beam steering device adapted to receive information related to a position of the head and eyes of each of the passengers from the passenger monitoring system, and the display is adapted to project the holographic image to the beam steering device and the beam steering device is adapted to re-direct the projected holographic image to the eyes of each of the passengers, based on the information received from the passenger monitoring system.

20 Claims, 5 Drawing Sheets

(51) Int. Cl.
|   |   |
|---|---|
| *H04N 13/398* | (2018.01) |
| *B60K 35/22* | (2024.01) |
| *G02B 26/08* | (2006.01) |

(52) U.S. Cl.
CPC ............. *G02B 30/33* (2020.01); *G02B 30/56* (2020.01); *H04N 13/32* (2018.05); *H04N 13/363* (2018.05); *H04N 13/383* (2018.05); *H04N 13/398* (2018.05); *B60K 35/22* (2024.01); *B60K 2360/23* (2024.01); *B60K 2360/29* (2024.01); *G02B 26/0833* (2013.01); *G02B 26/0883* (2013.01)

(58) Field of Classification Search
CPC ........... B60W 50/14; B60W 2420/403; H04N 13/239; H04N 2013/0081; H04N 13/243; H04N 13/271
See application file for complete search history.

(56) References Cited

U.S. PATENT DOCUMENTS

| | | | | |
|---|---|---|---|---|
| 2018/0293786 | A1* | 10/2018 | Insko | G06T 15/405 |
| 2019/0124313 | A1* | 4/2019 | Li | H04N 13/324 |
| 2021/0070176 | A1* | 3/2021 | Rao | G09G 3/36 |
| 2022/0058780 | A1* | 2/2022 | Kobayashi | B60K 35/211 |
| 2022/0091723 | A1* | 3/2022 | Faulkner | G06F 3/017 |
| 2022/0092862 | A1* | 3/2022 | Faulkner | G06F 3/017 |
| 2022/0101593 | A1* | 3/2022 | Rockel | G06F 3/017 |
| 2022/0101613 | A1* | 3/2022 | Rockel | G06F 3/04845 |
| 2022/0155591 | A1* | 5/2022 | Klug | G02B 27/18 |
| 2022/0214743 | A1* | 7/2022 | Dascola | G06F 3/017 |
| 2023/0011407 | A1* | 1/2023 | Lee | B60K 35/211 |
| 2023/0041447 | A1* | 2/2023 | Huber | G09G 3/002 |
| 2023/0076304 | A1* | 3/2023 | Müller | B60K 35/23 |
| 2023/0081246 | A1* | 3/2023 | Yueh | G02B 30/31 349/15 |
| 2023/0092874 | A1* | 3/2023 | Krivoruchko | G06F 3/012 715/849 |
| 2023/0100610 | A1* | 3/2023 | Pastrana Vicente | G06F 3/011 715/727 |
| 2023/0106627 | A1* | 4/2023 | Dascola | G06F 3/011 345/419 |
| 2023/0114043 | A1* | 4/2023 | Wan | G06F 3/04842 345/633 |
| 2024/0005824 | A1* | 1/2024 | Zhou | G09G 3/003 |
| 2024/0103615 | A1* | 3/2024 | Huergo Wagner | G06F 3/012 |
| 2024/0153205 | A1* | 5/2024 | Huergo Wagner | G06T 17/00 |
| 2024/0253465 | A1* | 8/2024 | Shintani | G02B 27/0093 |

* cited by examiner

AUTOSTEREOSCOPIC CAMPFIRE DISPLAY

INTRODUCTION

The present disclosure relates to a system for generating a floating image viewable by a passenger within a vehicle.

Current entertainment systems within vehicles generally comprise a screen or monitor that is mounted within the vehicle for viewing by the passengers. Some systems include smaller individual screens, wherein each passenger has a screen for their personal viewing. Known systems incorporate inverse head-up-display architectures that use beams splitters that must be attached to structure within the vehicle compartment and must be constantly re-adjusted to accommodate height and position variations of the passenger within the vehicle compartment.

While current systems achieve their intended purpose, there is a need for a new and improved system for providing a floating three-dimensional image that appears centrally located within the vehicle for a plurality of passengers within the vehicle.

SUMMARY

According to several aspects of the present disclosure, a system for generating a floating image for a plurality of passengers within a vehicle includes a passenger monitoring system adapted to monitor the position of head and eyes of each of the plurality of passengers, a compute engine in communication with the passenger monitoring system and adapted to calculate a holographic image and encode the holographic image to a display of a picture generating unit (PGU) hologram generator, and a beam steering device, wherein the beam steering device is adapted to receive, via the compute engine, information related to a position of the head and eyes of each of the plurality of passengers from the passenger monitoring system, and the display is adapted to project the holographic image to the beam steering device and the beam steering device is adapted to re-direct the projected holographic image to the eyes of each of the plurality of passengers, based on the information received from the passenger monitoring system.

According to another aspect, the compute engine is further adapted to encode a lens function into the holographic image based on information received from the passenger monitoring system.

According to another aspect, the holographic image includes a right-eye image and a left-eye image, the compute engine is adapted to calculate the right-eye image and the left-eye image and to alternately encode the right-eye image to the display and encode the left-eye image to the display, switching back and forth between encoding the right-eye image and encoding the left-eye image at a frequency greater than 30 Hz, the display is adapted to project, alternately, at a frequency greater than 30 Hz and in sync with the compute engine, the right-eye image and the left-eye image to the beam steering device, and the beam steering device is adapted to re-direct the right-eye image directly to a right eye of each of the plurality of passengers and re-direct the left-eye image directly to a left eye of each of the plurality of passengers, wherein the right-eye image and the left-eye image are slightly different perspectives of a single image such that when the right eye of each of the plurality of passengers receives the right-eye image and the left eye of each of the plurality of passengers receives the left-eye image, each of the plurality of passengers perceives a three-dimensional image floating within the vehicle.

According to another aspect, the beam steering device includes a waveguide having an exit surface with a fixed wavefront curvature adapted to adjust an accommodation distance of the holographic image.

According to another aspect, the beam steering device further includes a first lens adapted to further adjust the accommodation distance of the right-eye image and a second lens adapted to further adjust the accommodation distance of the left-eye image.

According to another aspect, the beam steering device includes a first splitting prism adapted to re-direct the right-eye image to the right eye of each of the plurality of passengers and a second splitting prism adapted to re-direct the left-eye image to the left eye of each of the plurality of passengers.

According to another aspect, the beam steering device further includes a plurality of directional lenses, each one of the plurality of directional lenses adapted to one of steer the right-eye image to the right eye of one of the plurality of passengers, or steer the left-eye image to the left eye of one of the plurality of passengers.

According to another aspect, the beam steering device further includes a plurality of microelectromechanical systems (MEMS) mirrors, each one of the plurality of MEMS mirrors adapted to one of steer the right-eye image to the right eye of one of the plurality of passengers, or steer the left-eye image to the left eye of one of the plurality of passengers.

According to another aspect, the display includes a right-eye display and a left-eye display, the compute engine is adapted to calculate the right-eye image and the left-eye image and to simultaneously encode the right-eye image to the right-eye display and encode the left-eye image to the left-eye display, and the right-eye display and the left-eye display are adapted to project, simultaneously, the right-eye image through the waveguide to the first splitting prism and the left-eye image through the waveguide to the second splitting prism.

According to another aspect, the beam steering device is mounted within the vehicle adjacent to or above passenger seating that is opposite the plurality of passengers.

According to several aspects of the present disclosure, a method of generating a floating image for a plurality of passengers within a vehicle includes monitoring, with a passenger monitoring system, the position of head and eyes of the plurality of passengers, calculating, with a compute engine in communication with the passenger monitoring system, a holographic image and encoding the holographic image onto a display of a picture generating unit (PGU) hologram generator, receiving, with a beam steering device, via the compute engine, information related to a position of the passenger's head and eyes from the passenger monitoring system, and projecting, with the display, the holographic image to the beam steering device, and, re-directing, with the beam steering device, the projected holographic image to the eyes of each of the plurality of passengers, based on the information received from the passenger monitoring system.

According to another aspect, the method further includes encoding, with the compute engine, a lens function into the holographic image based on information received from the passenger monitoring system.

According to another aspect, the holographic image includes a right-eye image and a left-eye image, and the calculating, with the compute engine, the holographic image further includes, calculating, with the compute engine, the right-eye image and the left-eye image, the encoding the holographic image onto the display of the picture generating unit (PGU) hologram generator further includes alternately encoding, with the compute engine, the right-eye image to the display and encoding, with the compute engine, the left-eye image onto the display, and switching back and forth between encoding the right-eye image and encoding the left-eye image at a frequency greater than 30 Hz, the projecting, with the display, the holographic image to the beam steering device further includes projecting, alternately, at a frequency greater than 30 Hz and in sync with the compute engine, the right-eye image and the left-eye image to the beam steering device, and the re-directing, with the beam steering device, the projected holographic image to the eyes of each of the plurality of passengers further includes re-directing, with the beam steering device, the right-eye image directly to the right eye of each of the plurality of passengers and re-directing, with the beam steering device, the left-eye image directly to the left eye of each of the plurality of passengers, wherein the right-eye image and the left-eye image are slightly different perspectives of a single image such that when the right eye of each of the plurality of passengers receives the right-eye image and the left eye of each of the plurality of passengers receives the left-eye image, each of the plurality of passengers perceives a three-dimensional image floating within the vehicle.

According to another aspect, the re-directing, with the beam steering device, the projected holographic image to the eyes of each of the plurality of passengers further includes adjusting an accommodation distance of the holographic image with an exit surface of a waveguide of the beam steering device.

According to another aspect, the re-directing, with the beam steering device, the projected holographic image to the eyes of each of the plurality of passengers further includes adjusting the accommodation distance of the right-eye image of the holographic image with a first lens, and adjusting the accommodation distance of the left-eye image of the holographic image with a second lens.

According to another aspect, the re-directing, with the beam steering device, the projected holographic image to the eyes of each of the plurality of passengers further includes steering the right-eye image to the right eye of each one of the plurality of passengers with one of a plurality of directional lenses and steering the left-eye image to the left eye of each one of the plurality of passengers with one of the plurality of directional lenses.

According to another aspect, the re-directing, with the beam steering device, the projected holographic image to the eyes of each of the plurality of passengers further includes steering the right-eye image to the right eye of each one of the plurality of passengers with one of a plurality of micro-electromechanical systems (MEMS) mirrors and steering the left-eye image to the left eye of each one of the plurality of passengers with one of the plurality of MEMS mirrors.

According to another aspect, the display comprises a right-eye display and a left-eye display, and wherein the encoding the holographic image to the display of the picture generating unit (PGU) hologram generator further includes simultaneously encoding, with the compute engine, the right-eye image to the right-eye display and encoding, with the compute engine, the left-eye image to the left-eye display, the projecting, with the display, the holographic image to the beam steering device further includes simultaneously projecting, with the right-eye display and the left-eye display, the right-eye image and the left-eye image, and the re-directing, with the beam steering device, the projected holographic image to the eyes of each of the plurality of passengers further includes re-directing, simultaneously, the right-eye image directly to the right eye of each of the plurality of passengers, and, the left-eye image directly to the left eye of each of the plurality of passengers, wherein the right-eye image and the left-eye image are slightly different perspectives of a single image such that when the right eye of each of the plurality of passengers receives the right-eye image and the left eye of each of the plurality of passengers receives the left-eye image, each of the plurality of passengers perceives a three-dimensional image floating within the vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
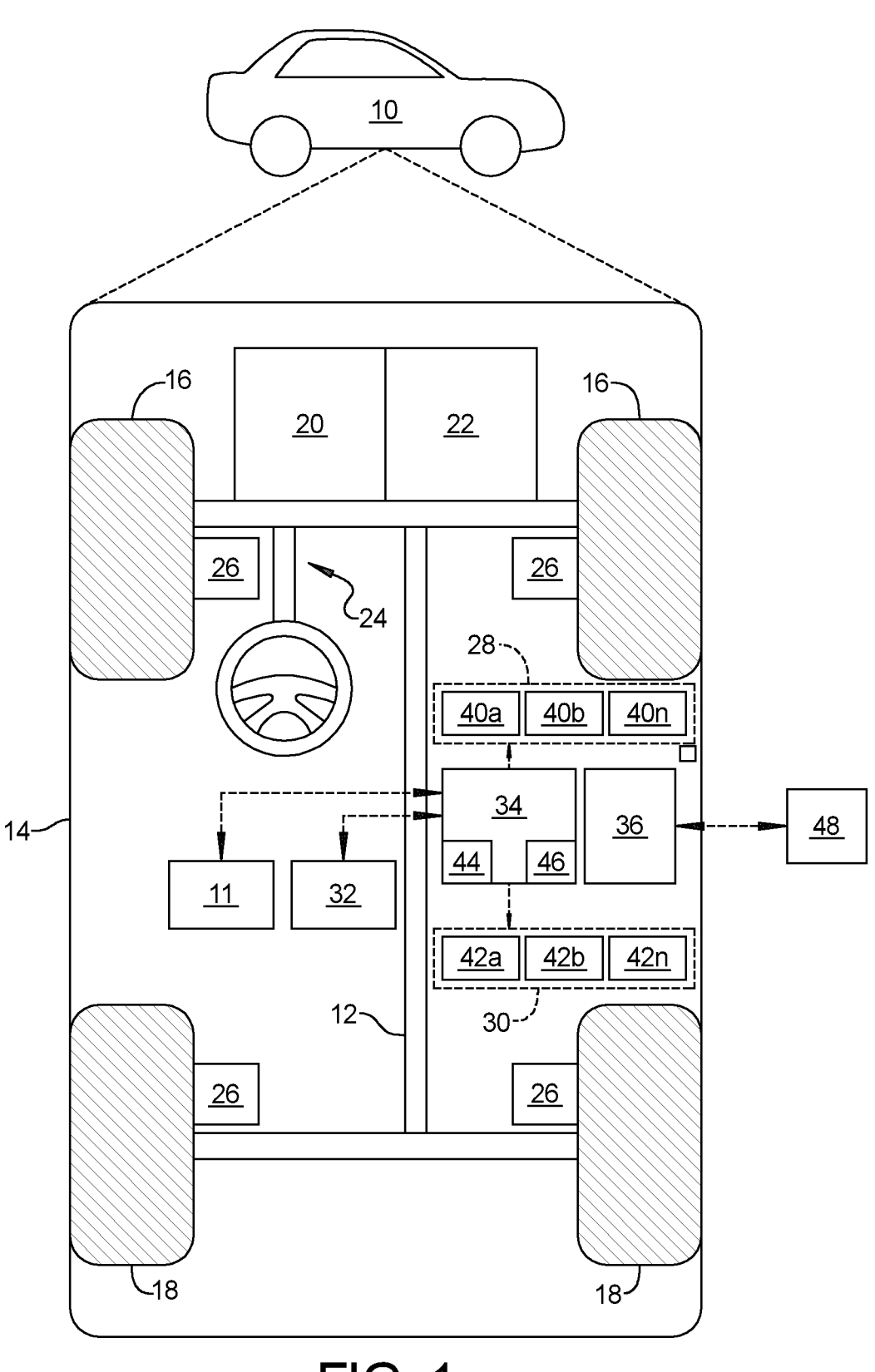
FIG. 1 is a schematic diagram of a vehicle according to an exemplary embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

In accordance with an exemplary embodiment, FIG. 1 shows a vehicle 10 with an associated system 11 for generating a floating image for a plurality of passengers within the vehicle 10 in accordance with various embodiments. In general, the system 11 for generating a floating image for the plurality of passengers within the vehicle 10 works in conjunction with other systems within the vehicle 10 to display various information and infotainment content for the passenger. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system 11 is incorporated into the autonomous vehicle 10 (hereinafter referred to as the autonomous vehicle 10). The autonomous vehicle 10 is, for example, a vehicle that is automatically controlled to carry passengers from one location to another. The autonomous vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, a controller 34, and a communication system 36. In an embodiment in which the autonomous vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image. The sensing devices 40a-40n can include sensors that monitor dynamic variables of the vehicle, such as its velocity, its acceleration, a number of times that the brake is applied, etc. The actuator system 30 includes one or more actuator devices 42a-42n that control one or more vehicle 10 features such as, but not limited to, the propulsion system 20, the transmission system 22, the steering system 24, and the brake system 26.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the controller 34, a semi-conductor based microprocessor (in the form of a microchip or chip set), a macro-processor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The communication system 36 is configured to wirelessly communicate information to and from other remote entities 48, such as but not limited to, other vehicles ("V2V" communication) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

Figure 2:
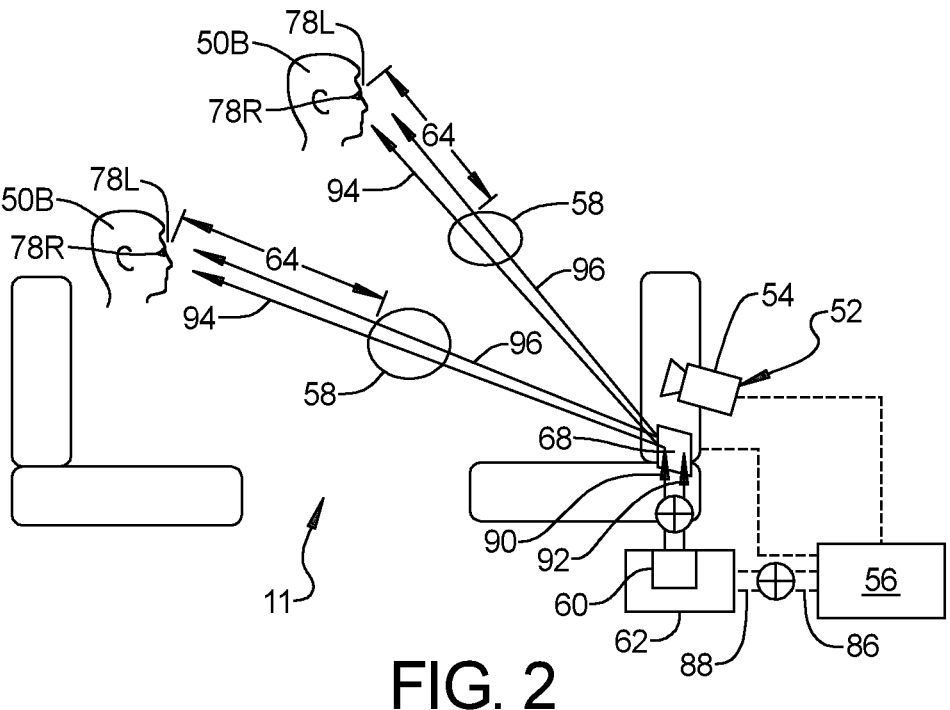
FIG. 2 is a schematic diagram of a system according to an exemplary embodiment of the present disclosure.

Referring to FIG. 2, the system 11 for generating a floating image for the plurality of passengers 50 within the vehicle 10 includes a passenger monitoring system 52 which includes at least one camera 54 that is adapted to monitor the position of the head and eyes 78R, 78L of each of the plurality of passengers 50. For purposes of description, the plurality of passengers 50 in FIG. 2 is shown including a first passenger 50A and a second passenger 50B. The passenger monitoring system 52, often referred to as a driver monitoring system or DMS, is an artificial intelligence (AI)-based vehicle safety technology that monitors each of the plurality of passengers 50A, 50B attentiveness through the at least one camera 54. Purposes of the passenger monitoring system 52 is to identify the passengers and detect levels of vigilance through software and provide alerts in cases of drowsiness, distractions, etc. to avert accidents. The main features of DMS are driver ID, distraction detection, drowsiness detection, specific activity detection, eyeblink detection, emotion recognition and eyeball tracking. Used within the system 11 of the present disclosure, the primary purpose of the driver monitoring system 52 is to monitor the location of the eyes 78R, 78L of each of the plurality of passengers 50A, 50B and the direction of the gaze of each of the plurality of passengers 50A, 50B.

The system 11 further includes a compute engine 56 in communication with the passenger monitoring system 52 and adapted to calculate a holographic image 58 (phase hologram) and encode the holographic image 58 to a display 60 of a picture generating unit (PGU) hologram generator 62. The display 60 is irradiated with a light source, such as by way of non-limiting examples, RGB laser light or SLED light sources. When irradiated, each of the display pixels will produce a wavefront having a phase that corresponds to the phase of the position of the hologram encoded at that pixel.

In an exemplary embodiment, the compute engine 56 is further adapted to encode a lens function into the holographic image 58 based on information received from the passenger monitoring system 52. The passenger monitoring system 52 gathers information on the exact location of the eyes 78R, 78L of each of the plurality of passengers 50A, 50B and determines an appropriate accommodation distance 64 at which the holographic image 58 should be perceived by each of the plurality of passengers 50A, 50B. The multiple wavefronts exiting the display 60 constructively and destructively interfere with one another revealing an image pattern of the holographic image 58 at the appropriate distance 64 that is tunable by also encoding a lens function into the encoded holographic image. Thus, two pieces of information are encoded into the holographic image 58, the image information and the appropriate accommodation distance 64 at which each of the plurality of passengers 50A, 50B should perceive the holographic image 58 (the distance where the wavefronts come together to form the holographic image 58). Tunability of the appropriate accommodation distance 64 allows the system 11 to display the holographic image 58 with variable virtual image distance. Holographic images with variable virtual image distance allows the system 11 to project a floating holographic image 58 to each of the plurality of passengers 50A, 50B with the capability of making the floating holographic image 58 appear closer or further away.

The light exiting the display 60 travels along a path in a straight line, as indicated by arrows 90, 92 until it encounters a beam steering device 68. In an exemplary embodiment, the beam steering device 68 is adapted to receive, via the compute engine 56, information related to a position of the head and eyes 78R, 78L of each of the plurality of passengers 50A, 50B from the passenger monitoring system 52, and re-directs the holographic image 58 to the passenger's 50A, 50B eye(s) 78R, 78L, as indicated by arrows 94 and 96. The passenger's 50A, 50B corneal lens Fourier transforms the holograms creating an image on the passenger's 50A, 50B retina. The holographic image 58 is perceived in front of each of the plurality of passengers 50A, 50B at the appropriate distance 64 from the passenger 50A, 50B, as specified by the lens function encoded into the holographic image 58.

Figure 3:
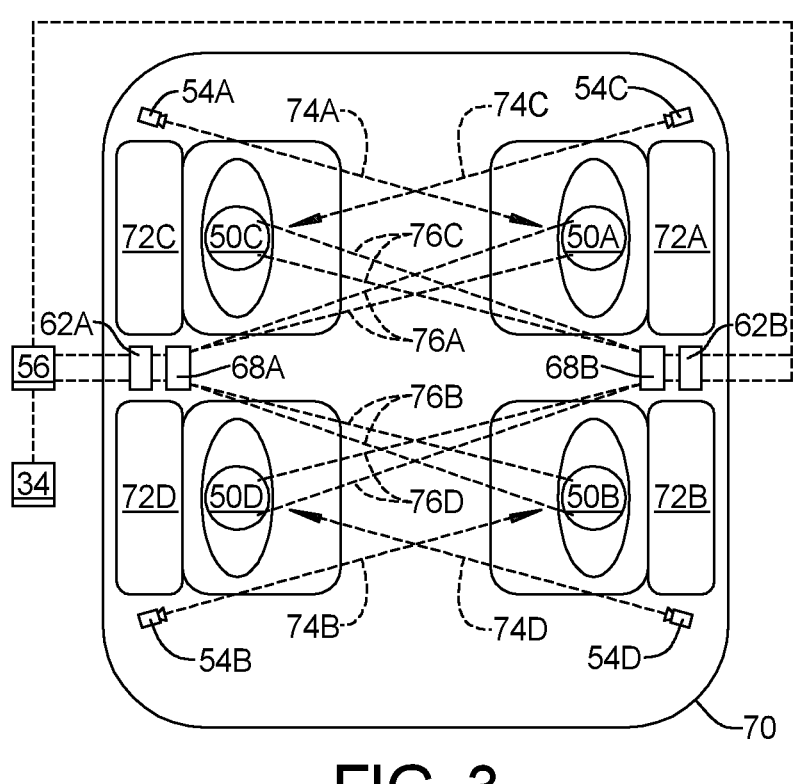
FIG. 3 is a schematic top view of a vehicle compartment wherein each of four passengers seated therein has access to a system according to an exemplary embodiment of the present disclosure.

Referring to FIG. 3, in an exemplary embodiment, the system 11 is provided for each passenger 50A, 50B, 50C, 50D within a vehicle compartment 70 of the vehicle 10. As shown, the vehicle compartment 70 includes a first seat 72A wherein a first passenger 50A is seated, a second seat 72B, wherein a second passenger 50B is seated, a third seat 72C, wherein a third passenger 50C is seated, and a fourth seat 72D, wherein a fourth passenger 50D is seated.

First and second passengers 50A, 50B comprise a first plurality of passengers. A first camera 54A of the passenger monitoring system 52 monitors the location of the eyes of the first passenger 50A, as indicated by arrow 74A. A second camera 54B of the passenger monitoring system 52 monitors the location of the eyes of the second passenger 50B, as indicated by arrow 74B. A compute engine 56, a first PGU hologram generator 62A, and a first beam steering device 68A direct a first holographic image 58 to the eyes of the first plurality of passengers including the first passenger 50A, as indicated by arrows 76A and the second passenger 50B, as indicated by arrows 76B. Third and fourth passengers 50C, 50D comprise a second plurality of passengers. A third camera 54C of the passenger monitoring system 52 monitors the location of the eyes of the third passenger 50C, as indicated by arrow 74C. A fourth camera 54D of the passenger monitoring system 52 monitors the location of the eyes of the fourth passenger 50D, as indicated by arrow 74B. The compute engine 56, a second PGU hologram generator 62B, and a second beam steering device 68B direct a second holographic image to the eyes of the third passenger 50C, as indicated by arrows 76C, and to the eyes of the fourth passenger 50D, as indicated by arrows 76D.

As shown in FIG. 3, a single compute engine 56 supports the first, second, third and fourth cameras 54A, 54B, 54C, 54D of the passenger monitoring system 52, the first and second PGU hologram generators 62A, 62B, and the first and second beam steering devices 68A, 68B. It should be understood that multiple compute engines could be utilized without departing from the scope of the present disclosure.

Figure 4:
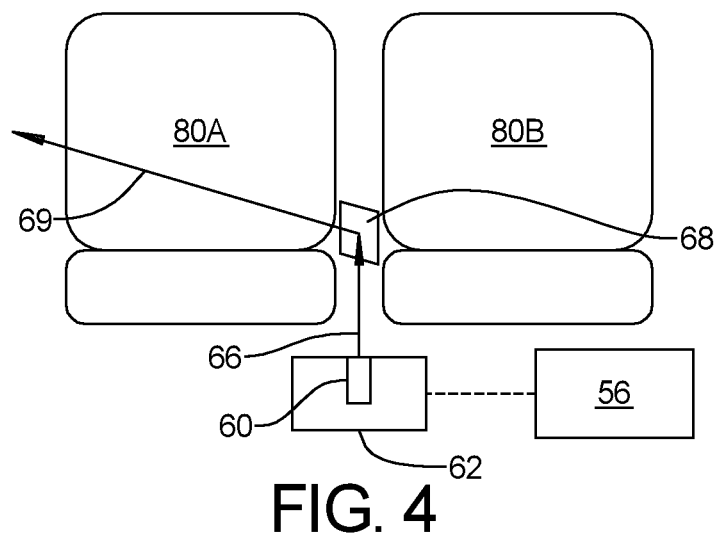
FIG. 4 is a front schematic view of two seats within a vehicle wherein a system according to an exemplary embodiment is positioned between the two seats.

Referring to FIG. 4, in an exemplary embodiment, the beam steering device 68 is mounted within the vehicle 10 adjacent to or above passenger seating 80A, 80B that is opposite the plurality of passengers 50A, 50B. As shown in FIG. 4, the beam steering device 68 is positioned between two seats 80A, 80B that are directly across from seats that the plurality of passengers 50A, 50B are seated in. This positions the beam steering device 68 at a horizontal and vertical position that provides optimal opportunity for the beam steering device 68 to re-direct the holographic image from the PGU, as indicated by arrow 66, directly to the eyes 78R, 78L of each of the plurality of passengers 50A, 50B, as indicated by arrow 69. Referring again to FIG. 3, the first PGU 62A and first beam steering device 68A that provide images for the first and second passengers 50A, 50B are positioned between the third and fourth seats 72C, 72D for the third and fourth passengers 50C, 50D. Likewise, the second PGU 62B and second beam steering device 68B that provide images for the third and fourth passengers 50C, 50D are positioned between the first and second seats 72A, 72B for the first and second passengers 50A, 50B directly across from the third and fourth passengers 50C, 50D.

It should be understood that the beam steering devices 68A, 68B could also be positioned higher up within the vehicle 10, above the first, second, third and fourth seats 72A, 72B, 72C, 72D. The primary issue when placing the PGU hologram generators 62A, 62B and the beam steering devices 68A, 68B is ensuring that passengers 50A, 50B, 50C, 50D seated within the first, second, third and fourth seats 72A, 72B, 72C, 72D do not block the re-direction of the holographic images to the other passengers 50A, 50B, 50C, 50D.

Referring again to FIG. 2, in another exemplary embodiment, the holographic image 58 includes a right-eye image (represented by arrow 94) and a left-eye image (represented by arrow 96). The compute engine 56 is adapted to calculate the right-eye image and the left-eye image and to alternately encode the right-eye image onto the display 60, as shown by line 86, and to encode the left-eye image onto the display 60, as shown by line 88, switching back and forth between encoding the right-eye image and encoding the left-eye image at a frequency greater than 30 Hz.

The display 60 is adapted to project, alternately, at a frequency greater than 30 Hz and in sync with the compute engine 56, the right-eye image to the beam steering device 68, as indicated by arrow 90, and the left-eye image to the beam steering device 68, as indicated by arrow 92. The display 60 is in sync with the compute engine 56, wherein, when the compute engine 56 is encoding the right eye image to the display 60, as indicated by line 86, the display 60 is projecting the right eye image to the beam steering device 68, as indicated by arrow 90, and, when the compute engine 56 is encoding the left eye image to the display 60, as indicated by line 88, the display 60 is projecting the left eye image to the beam steering device 68, as indicated by arrow 92.

The beam steering device 68 is adapted to re-direct the right-eye image directly to a right eye 78R of each of the plurality of passengers 50A, 50B, as indicated by arrows 94, and re-direct the left-eye image directly to a left eye 78L of each of the plurality of passengers 50A, 50B, as indicated by arrows 96, wherein the right-eye image and the left-eye image are slightly different perspectives of a single image such that when the right eye 78R of each of the plurality of passengers 50A, 50B receives the right-eye image and the left eye 78L of each of the plurality of passengers 50A, 50B receives the left-eye image, each of the plurality of passengers 50A, 50B perceives a three-dimensional image 58 floating within the vehicle 10.

This is known as sequential time-multiplexing. Sequential time-multiplexing requires the PGU 62 and the compute engine 56 to be capable of switching back and forth between the right-eye image and the left-eye image fast enough to eliminate any perceptible image flicker by the viewing passenger 50. In an exemplary embodiment, the beam steering device 68 is adapted to sequentially re-direct the right-eye image of the holographic image 58 to the right eye 78R of each of the plurality of passengers 50A, 50B, as indicated by arrows 94, for less than 33 μs. After 33 μs, the compute engine 56 and the PGU 62 switch to projecting the left-eye image to the beam steering device 68, and the beam steering device 68 re-directs the left-eye image of the holographic image 58 to the left eye 78L, as indicated by arrows 96. The left-eye image of the holographic image 58 is re-directed to the left eye 78L of each of the plurality of passengers 50A, 50B for less than 33 μs.

This process is repeated, by alternating between the right-eye image and the left-eye image for less than 33 μs. If the frequency of switching between the right-eye image and the left-eye image is greater than 30 Hz, flicker will not be perceptible by the plurality of passengers 50A, 50B, and the right-eye image and left-eye image of the holographic image 58 will be fused into one image 58, as perceived by the passengers 50A, 50B.

This provides an autostereoscopic three-dimensional display by adding binocular perception of three-dimensional depth without the use of special headgear, glasses, something that affects the viewer's vision, or anything for the viewer's eyes. Because headgear is not required, autostereoscopic displays are also referred to as "glasses-free 3D" or "glassesless 3D".

Figure 5:
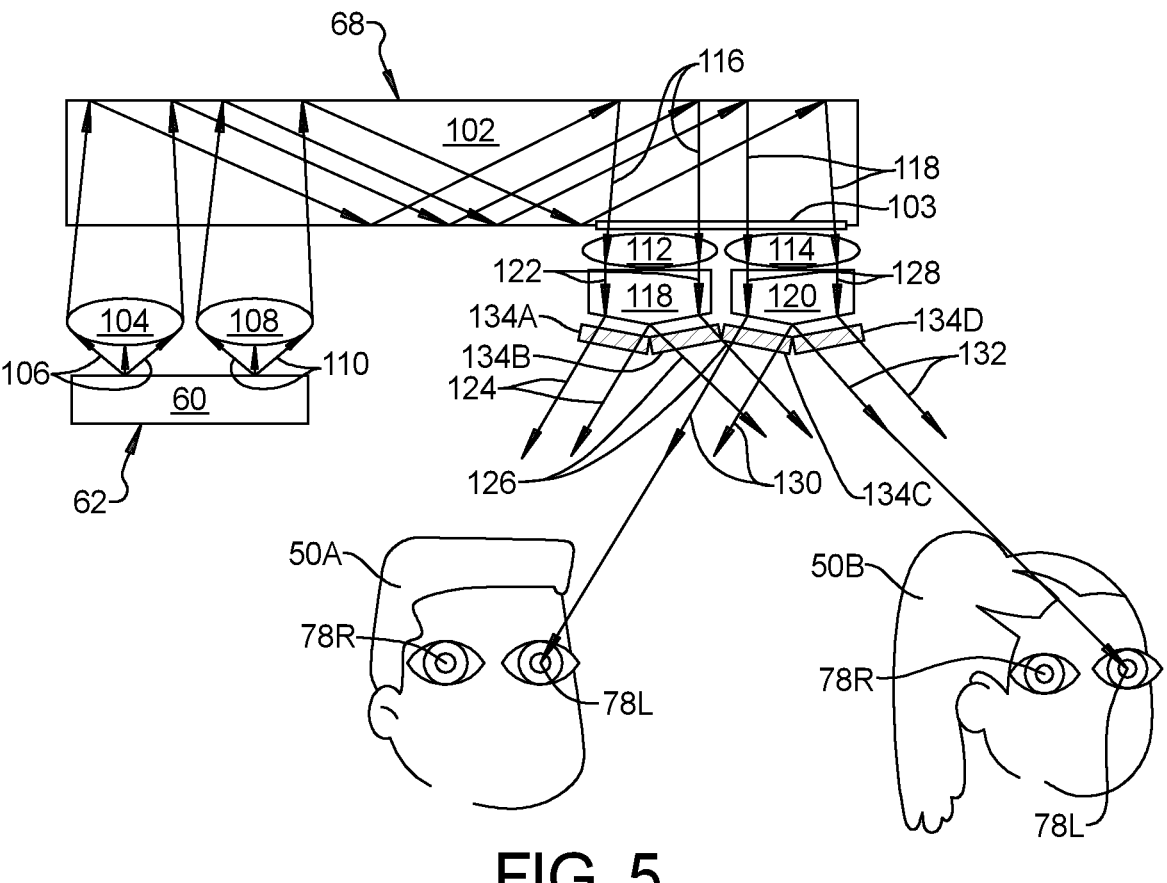
FIG. 5 is a schematic view of a system according to an exemplary embodiment wherein the beam steering device includes a waveguide and a single display is adapted to switch back and forth between projecting a right-eye image and a left-eye image.

Referring to FIG. 5, in an exemplary embodiment, the beam steering device 68 includes a waveguide 102 having an exit surface 103 with a fixed wavefront curvature adapted to adjust the accommodation distance 64 of the image 58. The image 58 is projected into the waveguide 102 and then propagates inside the waveguide 102 and is extracted multiple times. The re-circulation of the light several times within the waveguide 102 can expand the image so the viewer can see the image 58 from an extended eye-box. In addition to expanding the eye-box, the waveguide 102 can also magnify the original projected image coming out of the PGU 62.

The waveguide 102 may be a holographic waveguide that uses a holographic element as an in-coupling and out-coupling element is a symmetric fashion with a planar waveguide in between, or alternatively, waveguide geometry that preserves the phase of the in-coupled light passing through. The waveguide 102 may also be a diffractive waveguide, wherein, in place of holographic elements present in the holographic waveguide, the diffractive waveguide includes diffractive elements. Still further, the waveguide 102 may be a geometric waveguide which uses only coated surfaces within the waveguide 102 as the in-couplers and out-couplers where light enters and exits the waveguide 102. The type of waveguide 102 for a specific application depends on angular acceptance and spectral transmission/reflection requirements.

In an exemplary embodiment, the right-eye image passes through a right-eye collimater 104 before entering the waveguide 102 of the beam steering device 68, as indicated by arrows 106 and the left-eye image passes through a left-eye collimater 108 before entering the waveguide 102 of the beam steering device 68, as indicated by arrows 110. The right-eye collimater 104 and the left-eye collimater 108 narrows the image beam (alternately, the right-eye image and the left-eye image) projected by the display 60 and couples the transformed right-eye image and left-eye image into the waveguide 102.

The accommodation distance 64 is controlled by the exit surface 103 of the waveguide 102 by adding a fixed amount of wave front curvature to the collimated beam exiting the waveguide 102. In another exemplary embodiment, the beam steering device 68 further includes a first lens 112 adapted to further adjust the accommodation distance 64 of the right-eye image and a second lens 114 adapted to further adjust the accommodation distance 64 of the left-eye image. The first lens 112 acts on the projected right-eye image exiting the waveguide 102, as indicated by arrows 116, and the second lens 114 acts on the projected left-eye image exiting the waveguide 102, as indicated by arrows 118. In an exemplary embodiment, the first lens 112 and the second lens 114 are liquid crystal lenses adapted to shift the accommodation distance 64 based on an applied voltage. In another exemplary embodiment, the first lens 112 and the second lens 114 are varifocal liquid lenses that are adapted to shift the apparent accommodation distance 64 of the holographic image 58 based on time varied applied voltage.

In an exemplary embodiment, the beam steering device 68 includes a first splitting prism 118 adapted to re-direct the right-eye image to the right eye 78R of each of the plurality of passengers 50A, 50B and a second splitting prism 120 adapted to re-direct the left-eye image to the left eye 78L of each of the plurality of passengers 50B. The first splitting prism 118 and the second splitting prism 120 are multi-faceted prisms adapted to receive an incoming light beam and split it, or duplicate it into multiple beams. Thus, when the display 60 is projecting the right-eye image, the beam of the right-eye image enters the first splitting prism 118, as indicated by arrows 122, and is split or duplicated, wherein the right-eye image is directed to the first passenger 50A, as indicated by arrows 124, and the right-eye image is directed to the second passenger 50B, as indicated by arrows 126. Further, when the display 60 is projecting the left-eye image, the beam of the left-eye image enters the second splitting prism 120, as indicated by arrows 128, and is split or duplicated, wherein the left-eye image is directed to the first passenger 50A, as indicated by arrows 130, and the left-eye image is directed to the second passenger 50B, as indicated by arrows 132.

In an exemplary embodiment, the beam steering device 68 further includes a plurality of directional lenses 134A, 134B, 134C, 134D, each one of the plurality of directional lenses 134A, 134B, 134C, 134D adapted to one of steer the right-eye image to the right eye 78R of one of the plurality of passengers 50A, 50B, or steer the left-eye image to the left eye 78L of one of the plurality of passengers 50A, 50B. As the light beams of the right-eye image and the left-eye image exit the first and second splitting prisms 118, 120, the plurality of directional lenses 134A, 134B, 134C, 134D, in communication with the passenger monitoring system 52 via the compute engine 56, direct the right-eye image directly to the right eye 78R of each of the plurality of passengers 50A, 50B and direct the left-eye image directly to the left eye 78L of each of the plurality of passengers 50A, 50B.

The directional lenses 134A, 134B, 134C, 134D may be any type of lens or device suitable for steering light beams. In an exemplary embodiment, each of the directional lenses 134A, 134B, 134C, 134D is a liquid crystal lens adapted to redirect the direction of a beam of light passing therethrough based on an applied voltage, wherein, the compute engine 56, using data from the passenger monitoring system 52, adjusts the applied voltage, and thus the direction of the light beam passing through, for each of the plurality of directional lenses 134A, 134B, 134C, 134D.

In another exemplary embodiment, each of the directional lenses 134A, 134B, 134C, 134D is a microelectromechanical systems device. Micromirror devices are devices based on microscopically small mirrors. The mirrors are micro-electromechanical systems (MEMS), which means that their states are controlled by applying a voltage between the two electrodes around the mirror arrays. Digital micromirror devices are used in video projectors and optics and micro-mirror devices for light deflection and control. The mirrors can not only be switched between two states, their rotation is in fact continuous. Thus, they can be used to control the intensity and direction of incident light. A MEMS scanning micromirror generally consists of a silicon device with a millimeter-scale mirror at the center. The mirror is typically connected to flexures that allow it to oscillate on a single axis or biaxially, to project or capture light. A primary advantage of using a MEMS device is that MEMS devices are very fast, allowing the direction of re-directed incident light to be changed very rapidly.

As shown in FIG. 5, the beam steering device 68 includes four directional lenses 134A, 134B, 134C, 134D, one for the right eye 78R of each of the plurality of passengers 50A, 50B and one for the left eye 78L of each of the plurality of passengers 50A, 50B. When the display 60 is projecting the right-eye image, a first directional lens 134A receives the right-eye image from the first splitting prism 118 and directs the right-eye image to the right eye 78R of the first passenger 50A, as indicated by arrow 124. A second directional lens 134B receives the right-eye image from the first splitting prism 118 and directs the right-eye image to the right eye 78R of the second passenger 50B, as indicated by arrow 126. When the display 60 is projecting the left-eye image, a third directional lens 134C receives the left-eye image from the second splitting prism 120 and directs the left-eye image to the left eye 78L of the first passenger 50A, as indicated by arrow 130. A fourth directional lens 134D receives the left-eye image from the second splitting prism 120 and directs the left-eye image to the left eye 78L of the second passenger 50B, as indicated by arrow 132.

Figure 6:
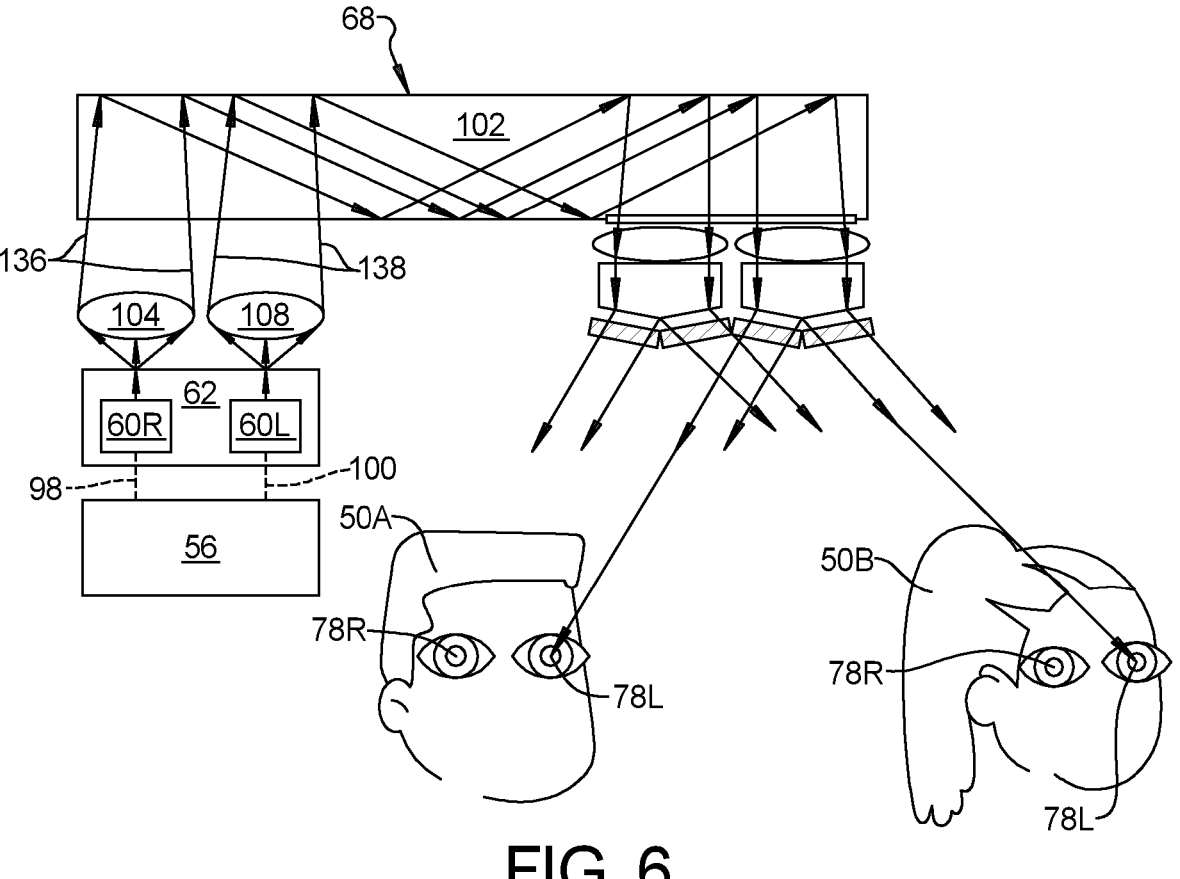
FIG. 6 is a schematic view of the system shown in FIG. 5 wherein the display comprises a right-eye display and a left-eye display adapted to simultaneously project a right-eye image and a left-eye image.

Referring to FIG. 6, in another exemplary embodiment, the display 60 includes a right-eye SLM 60R and a left-eye display 60L. The compute engine 56 is adapted to calculate the right-eye image and the left-eye image and to simultaneously encode the right-eye image to the right eye display 60R, as shown by line 98, and to encode the left-eye image to the left eye display 60L, as shown by line 100. The right-eye display 60R and the left-eye display 60L are adapted to project, simultaneously, the right-eye image, through the right eye collimater 104, and into the waveguide 102 of the beam steering device 68, as indicated by arrow 136, and the left-eye image, through the left eye collimater 108, and into the waveguide 102 of the beam steering device 68, as indicated by arrow 138.

As previously discussed, the right-eye image and the left-eye image are slightly different perspectives of a single image such that when the right eye 78R of each of the plurality of passengers 50A, 50B receives the right-eye image and the left eye 78L of each of the plurality of passengers 50B receives the left-eye image, the passenger's right eyes 78R and left eyes 78L will fuse the right eye image and the left eye image into the perceived three-dimensional holographic image 58 floating within the vehicle 10. In another exemplary embodiment, the right eye image and the left eye image are the same image, and thus, each of the plurality of passengers 50A, 50B perceives a two-dimensional holographic image 58 floating within the vehicle 10.

Figure 7:
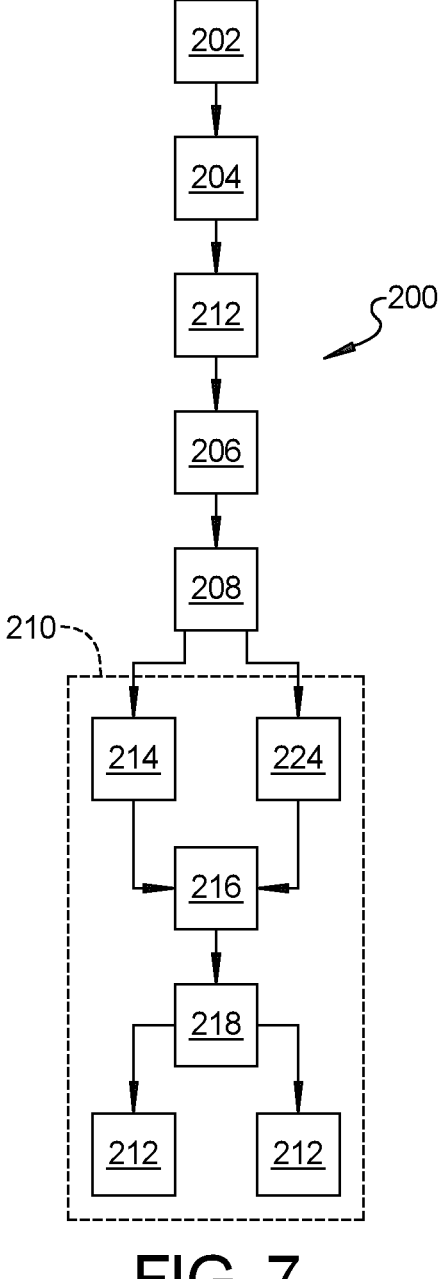
FIG. 7 is a schematic flow chart illustrating a method according to an exemplary embodiment of the present disclosure.

Referring to FIG. 7, a method 200 of generating a floating image for a plurality of passengers 50 within a vehicle 10, includes, starting at block 202, monitoring, with a passenger monitoring system 52, the position of head and eyes 78R, 78L of the plurality of passengers 50A, 50B, moving to block 204, calculating, with a compute engine 56 in communication with the passenger monitoring system 52, a holographic image 58 and encoding the holographic image 58 to a display 60 of a picture generating unit (PGU) hologram generator 62, moving to block 206, receiving, with a beam steering device 68, via the compute engine 56, information related to a position of the passenger's head and eyes 78R, 78L from the passenger monitoring system 52, moving to block 208, projecting, with the display 60, the holographic image 58 to the beam steering device 68, and, moving to block 210, re-directing, with the beam steering device 68, the projected holographic image 58 to the eyes 78R, 78L of each of the plurality of passengers 50A, 50B, based on the information received from the passenger monitoring system 52.

In an exemplary embodiment, the method 200 further includes, moving to block 212, encoding, with the compute engine 56, a lens function into the holographic image 58 based on information received from the passenger monitoring system 52.

In another exemplary embodiment, the holographic image 58 includes a right-eye image and a left-eye image, and the calculating, with the compute engine 56, the holographic image 58 at block 204 further includes, calculating, with the compute engine 56, the right-eye image and the left-eye image. The encoding the holographic image 58 to the display 60 of the picture generating unit (PGU) hologram generator 62 at block 212 further includes alternately encoding, with the compute engine 56, the right-eye image onto the display 60 and encoding, with the compute engine 56, the left-eye image onto the display 60, and switching back and forth between encoding the right-eye image and encoding the left-eye image at a frequency greater than 30 Hz. The projecting, with the display 60, the holographic image 58 to the beam steering device 68 at block 208 further includes projecting, alternately, at a frequency greater than 30 Hz and in sync with the compute engine 56, the right-eye image and the left-eye image to the beam steering device 68, and the re-directing, with the beam steering device 68, the projected holographic image 58 to the eyes 78R, 78L of each of the plurality of passengers 50A, 50B at block 210 further includes, moving to block 214, re-directing, with the beam steering device 68, the right-eye image directly to the right eye 78R of each of the plurality of passengers 50A, 50B and re-directing, with the beam steering device 68, the left-eye image directly to the left eye 78L of each of the plurality of passengers 50A, 50B, wherein the right-eye image and the left-eye image are slightly different perspectives of a single image such that when the right eye 78R of each of the plurality of passengers 50A, 50B receives the right-eye image and the left eye 78L of each of the plurality of passengers 50A, 50B receives the left-eye image, each of the plurality of passengers 50A, 50B perceives a three-dimensional image floating within the vehicle 10.

In another exemplary embodiment, the re-directing, with the beam steering device 68, the projected holographic image 58 to the eyes 78R, 78L of each of the plurality of passengers 50A, 50B at block 210 further includes, moving to block 216, adjusting an accommodation distance 64 of the holographic image 58 with an exit surface 103 of a waveguide 102 of the beam steering device 68.

In another exemplary embodiment, the re-directing, with the beam steering device 68, the projected holographic image 58 to the eyes 78R, 78L of each of the plurality of passengers 50A, 50B at block 210 further includes, moving to block 218, adjusting the accommodation distance 64 of the right-eye image of the holographic image 58 with a first lens 112, and adjusting the accommodation distance 64 of the left-eye image of the holographic image 58 with a second lens 114.

In another exemplary embodiment, the re-directing, with the beam steering device 68, the projected holographic image 58 to the eyes 78R, 78L of each of the plurality of passengers 50A, 50B at block 210 further includes, moving from block 218 to block 220, steering the right-eye image to the right eye 78R of each one of the plurality of passengers 50A, 50B with one of a plurality of directional lenses 134A, 134B, 134C, 134D and steering the left-eye image to the left eye 78L of each one of the plurality of passengers 50A, 50B with one of the plurality of directional lenses 134A, 134B, 134C, 134D.

In another exemplary embodiment, the re-directing, with the beam steering device 68, the projected holographic image 58 to the eyes 78R, 78L of each of the plurality of passengers 50A, 50B at block 210 further includes, moving from block 218 to block 222, steering the right-eye image to the right eye 78R of each one of the plurality of passengers 50A, 50B with one of a plurality of microelectromechanical systems (MEMS) mirrors and steering the left-eye image to the left eye 78L of each one of the plurality of passengers 50A, 50B with one of the plurality of MEMS mirrors.

In another exemplary embodiment, the display 60 comprises a right-eye display 60R and a left-eye display 60L, and wherein the encoding the holographic image 58 to the display 60 of the picture generating unit (PGU) hologram generator 62 at block 212 further includes simultaneously encoding, with the compute engine 56, the right-eye image onto the right-eye display 60R and encoding, with the compute engine 56, the left-eye image onto the left-eye display 60L, and the projecting, with the display 60, the holographic image 58 to the beam steering device 68 at block 208 further includes simultaneously projecting, with the right-eye display 60R and the left-eye display 60L, the right-eye image and the left-eye image, and the re-directing, with the beam steering device 68, the projected holographic image 58 to the eyes 78R, 78L of each of the plurality of passengers 50A, 50B at block 210 further includes, moving from block 208 to block 224, re-directing, simultaneously, the right-eye image directly to the right eye 78R of each of the plurality of passengers 50A, 50B, and, the left-eye image directly to the left eye 78L of each of the plurality of passengers 50A, 50B, wherein the right-eye image and the left-eye image are slightly different perspectives of a single image such that when the right eye 78R of each of the plurality of passengers 50A, 50B receives the right-eye image and the left eye 78L of each of the plurality of passengers 50A, 50B receives the left-eye image, each of the plurality of passengers 50A, 50B perceives a three-dimensional image 58 floating within the vehicle 10.

A system 11 and method 200 of the present disclosure offers several advantages. These include providing either a two-dimensional or three-dimensional holographic image 58 floating at a position within the vehicle 10 in front of a plurality of passengers 50A, 50B.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for generating a floating image for a plurality of passengers within a vehicle, comprising:
  a passenger monitoring system adapted to monitor the position of head and eyes of each of the plurality of passengers;
  a compute engine in communication with the passenger monitoring system and adapted to calculate a right-eye image and a left-eye image of a holographic image and alternately encode the right-eye image to a display of a picture generating unit (PGU) hologram generator and encode the left-eye image to the display of the PGU hologram generator, switching back and forth between encoding the right-eye image and encoding the left-eye image at a frequency greater than 30 Hz; and
  a beam steering device, wherein:
  the display is adapted to project, alternately, at a frequency greater than 30 Hz and in sync with the compute engine, the right-eye image and the left-eye image to the beam steering device;
  the beam steering device is adapted to receive, via the compute engine, information related to a position of the head and eyes of each of the plurality of passengers from the passenger monitoring system; and
  the display is adapted to project the right-eye image and the left-eye image of the holographic image to the beam steering device and the beam steering device is adapted to re-direct the right-eye image directly to a right eye of each of the plurality of passengers and re-direct the left-eye image directly to a left eye of each of the plurality of passengers, wherein the right-eye image and the left-eye image are different perspectives of a single image such that when the right eye of each of the plurality of passengers receives the right-eye image and the left eye of each of the plurality of passengers receives the left-eye image, each of the plurality of passengers perceives a three-dimensional image floating within the vehicle.

2. The system of claim 1, wherein the compute engine is further adapted to encode a lens function into the holographic image based on information received from the passenger monitoring system.

3. The system of claim 2, wherein the beam steering device includes a waveguide having an exit surface with a fixed wavefront curvature adapted to adjust an accommodation distance of the holographic image.

4. The system of claim 3, wherein the beam steering device further includes a first lens adapted to further adjust the accommodation distance of the right-eye image and a second lens adapted to further adjust the accommodation distance of the left-eye image.

5. The system of claim 3, wherein the beam steering device includes a first splitting prism adapted to re-direct the right-eye image to the right eye of each of the plurality of passengers and a second splitting prism adapted to re-direct the left-eye image to the left eye of each of the plurality of passengers.

6. The system of claim 5, wherein the beam steering device further includes a plurality of directional lenses, each one of the plurality of directional lenses adapted to one of:
  steer the right-eye image to the right eye of one of the plurality of passengers; or
  steer the left-eye image to the left eye of one of the plurality of passengers.

7. The system of claim 5, wherein the beam steering device further includes a plurality of microelectromechanical systems (MEMS) mirrors, each one of the plurality of MEMS mirrors adapted to one of:
  steer the right-eye image to the right eye of one of the plurality of passengers; or
  steer the left-eye image to the left eye of one of the plurality of passengers.

8. The system of claim 5, wherein:
  the display includes a right-eye display and a left-eye display;
  the compute engine is adapted to calculate the right-eye image and the left-eye image and to simultaneously encode the right-eye image to the right-eye display and encode the left-eye image to the left-eye display; and
  the right-eye display and the left-eye display are adapted to project, simultaneously, the right-eye image through the waveguide to the first splitting prism and the left-eye image through the waveguide to the second splitting prism.

9. The system of claim 1, wherein the beam steering device is mounted within the vehicle adjacent to or above passenger seating that is opposite the plurality of passengers.

10. A method of generating a floating image for a plurality of passengers within a vehicle, comprising:
  monitoring, with a passenger monitoring system, the position of head and eyes of the plurality of passengers;
  calculating, with a compute engine in communication with the passenger monitoring system, a right-eye image and a left-eye image of a holographic image and alternately encoding the right-eye image onto a display of a picture generating unit (PGU) hologram generator and the left-eye image onto the display of the PGU hologram generator and switching back and forth between encoding the right-eye image and encoding the left-eye image at a frequency greater than 30 Hz;
  receiving, with a beam steering device, via the compute engine, information related to a position of the passenger's head and eyes from the passenger monitoring system; and
  projecting, with the display, alternately, at a frequency greater than 30 Hz and in sync with the compute engine, the right-eye image and the left-eye image to the beam steering device, and, re-directing, with the beam steering device, the right-eye image directly to the right eye of each of the plurality of passengers and re-directing, with the beam steering device, the left-eye image directly to the left eye of each of the plurality of passengers, wherein the right-eye image and the left-eye image are different perspectives of a single image such that when the right eye of each of the plurality of passengers receives the right-eye image and the left eye of each of the plurality of passengers receives the left-eye image, each of the plurality of passengers perceives a three-dimensional image floating within the vehicle.

11. The method of claim 10, further including encoding, with the compute engine, a lens function into the holographic image based on information received from the passenger monitoring system.

12. The method of claim 11, wherein the re-directing, with the beam steering device, the projected holographic image to the eyes of each of the plurality of passengers further includes adjusting an accommodation distance of the holographic image with an exit surface of a waveguide of the beam steering device.

13. The method of claim 12, wherein the re-directing, with the beam steering device, the projected holographic image to the eyes of each of the plurality of passengers further includes adjusting the accommodation distance of the right-eye image of the holographic image with a first lens, and adjusting the accommodation distance of the left-eye image of the holographic image with a second lens.

14. The method of claim 12, wherein the re-directing, with the beam steering device, the projected holographic image to the eyes of each of the plurality of passengers further includes steering the right-eye image to the right eye of each one of the plurality of passengers with one of a plurality of directional lenses and steering the left-eye image to the left eye of each one of the plurality of passengers with one of the plurality of directional lenses.

15. The method of claim 12, wherein the re-directing, with the beam steering device, the projected holographic image to the eyes of each of the plurality of passengers further includes steering the right-eye image to the right eye of each one of the plurality of passengers with one of a plurality of microelectromechanical systems (MEMS) mirrors and steering the left-eye image to the left eye of each one of the plurality of passengers with one of the plurality of MEMS mirrors.

16. The method of claim 13, wherein the display comprises a right-eye display and a left-eye display, and wherein:

the encoding the holographic image to the display of the picture generating unit (PGU) hologram generator further includes simultaneously encoding, with the compute engine, the right-eye image to the right-eye display and encoding, with the compute engine, the left-eye image to the left-eye display;

the projecting, with the display, the holographic image to the beam steering device further includes simultaneously projecting, with the right-eye display and the left-eye display, the right-eye image and the left-eye image; and the re-directing, with the beam steering device, the projected holographic image to the eyes of each of the plurality of passengers further includes re-directing, simultaneously, the right-eye image directly to the right eye of each of the plurality of passengers, and, the left-eye image directly to the left eye of each of the plurality of passengers, wherein the right-eye image and the left-eye image are different perspectives of a single image such that when the right eye of each of the plurality of passengers receives the right-eye image and the left eye of each of the plurality of passengers receives the left-eye image, each of the plurality of passengers perceives a three-dimensional image floating within the vehicle.

17. A vehicle having a system for generating a floating image for a plurality of passengers within the vehicle, the system comprising:

a passenger monitoring system adapted to monitor the position of each of the plurality of passenger's head and eyes;

a compute engine in communication with the passenger monitoring system and adapted to:

calculate a right-eye image of a holographic image and a left-eye image of the holographic image;

alternately encode the right-eye image to a display of a picture generating unit (PGU) hologram generator, and encode the left-eye image to the display, switching back and forth between encoding the right-eye image and encoding the left-eye image at a frequency greater than 30 Hz; and encode a lens function into the holographic image based on information received from the passenger monitoring system; and a beam steering device, wherein:

the beam steering device is adapted to:

receive, via the compute engine, information related to a position of the head and eyes of each of the plurality of passengers from the passenger monitoring system;

adjust an accommodation distance of the holographic image with an exit surface of a waveguide, wherein the exit surface of the waveguide includes a fixed wavefront curvature;

adjust the accommodation distance of the right-eye image of the holographic image with a first lens and adjust the accommodation distance of the left-eye image of the holographic image with a second lens;

re-direct the right-eye image to the right eye of each of the plurality of passengers with a first splitting prism and re-direct the left-eye image to the left eye of each of the plurality of passengers with a second splitting prism; and steer the right-eye image to the right eye of each one of the plurality of passengers and steer the left-eye image to the left eye of each one of the plurality of passengers with one of:

a plurality of directional lenses; or a plurality of microelectromechanical systems mirrors;

the display is adapted to project, alternately, at a frequency greater than 30 Hz and in sync with the compute engine, the right-eye image and the left-eye image to the beam steering device and the beam steering device is adapted to re-direct the right-eye image directly to a right eye of each of the plurality of passengers and re-direct the left-eye image directly to a left eye of each of the plurality of passengers, based on the information received from the passenger monitoring system.

18. The vehicle of claim 17, wherein:

the display includes a right-eye display and a left-eye display;

the compute engine is adapted to calculate the right-eye image and the left-eye image and to simultaneously encode the right-eye image to the right-eye display and encode the left-eye image onto the left-eye display; and the right-eye display and the left-eye display are adapted to project, simultaneously, the right-eye image and the left-eye image to the beam steering device.

19. The system of claim 1, wherein the beam steering device includes a waveguide.

20. The system of claim 19, wherein the waveguide is one of a holographic waveguide or a diffractive waveguide.

* * * * *